Sept. 2, 1952 T. SHELLEY ET AL 2,608,818
INTERNAL-COMBUSTION ENGINE WITH SUPERCHARGER
DRIVEN BY AN EXHAUST TURBINE
Filed March 8, 1949 4 Sheets-Sheet 1
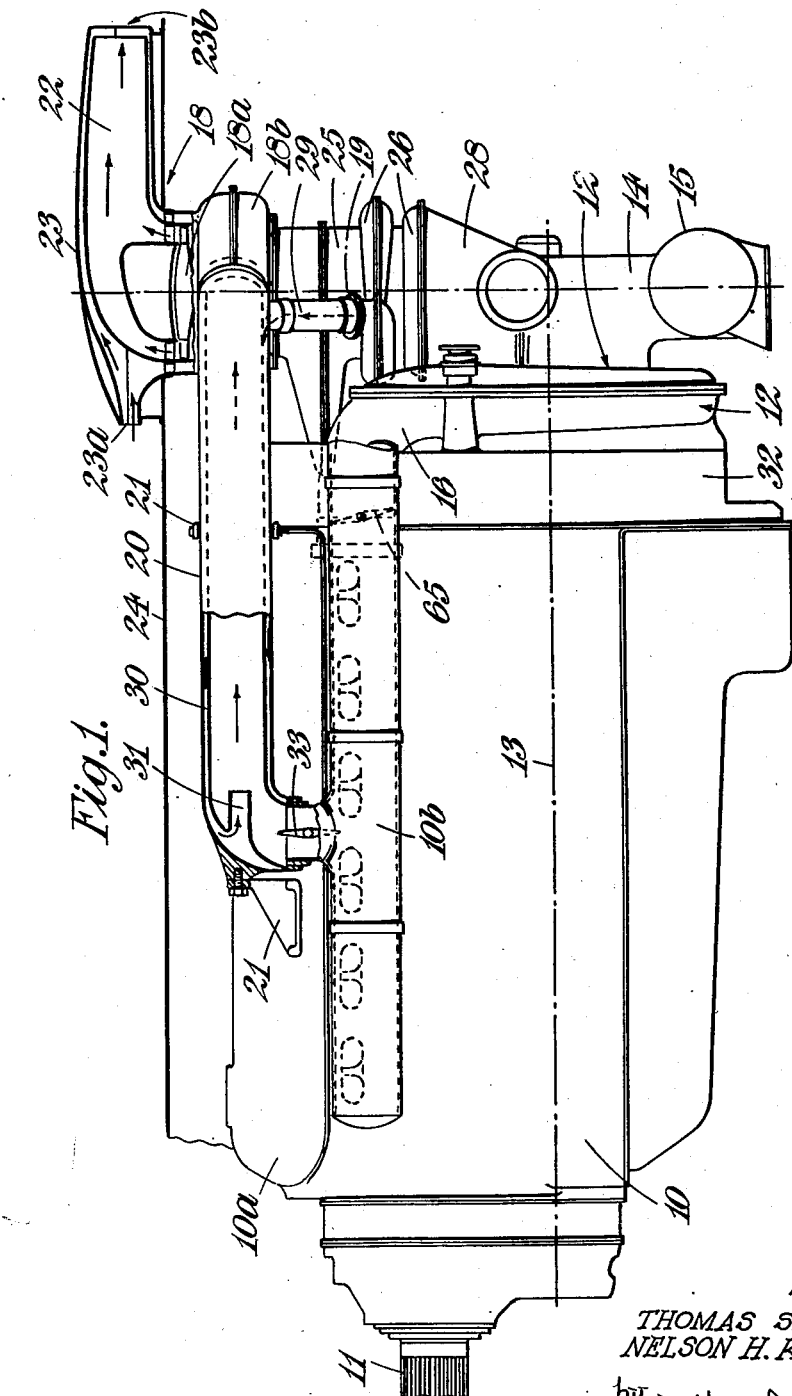
INVENTORS
THOMAS SHELLEY &
NELSON H. KENT
by Wilkinson Mawhinney
Attorneys Sept. 2, 1952 T. SHELLEY ET AL 2,608,818
INTERNAL-COMBUSTION ENGINE WITH SUPERCHARGER
DRIVEN BY AN EXHAUST TURBINE
Filed March 8, 1949 4 Sheets-Sheet 2
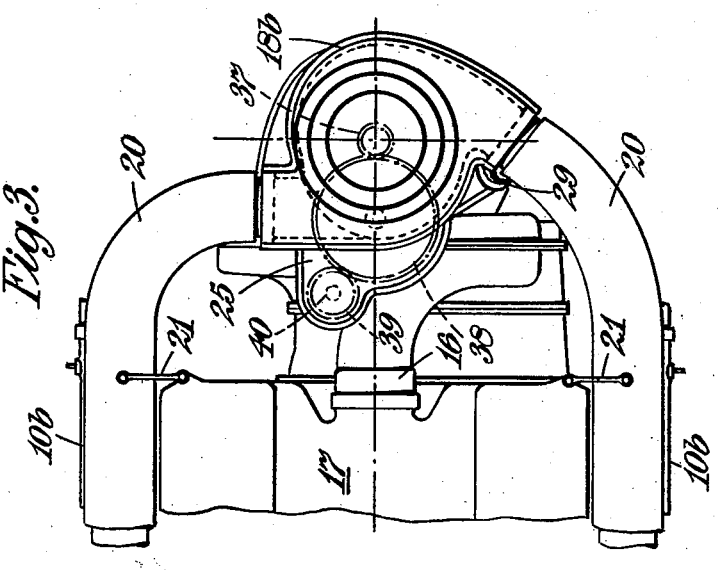
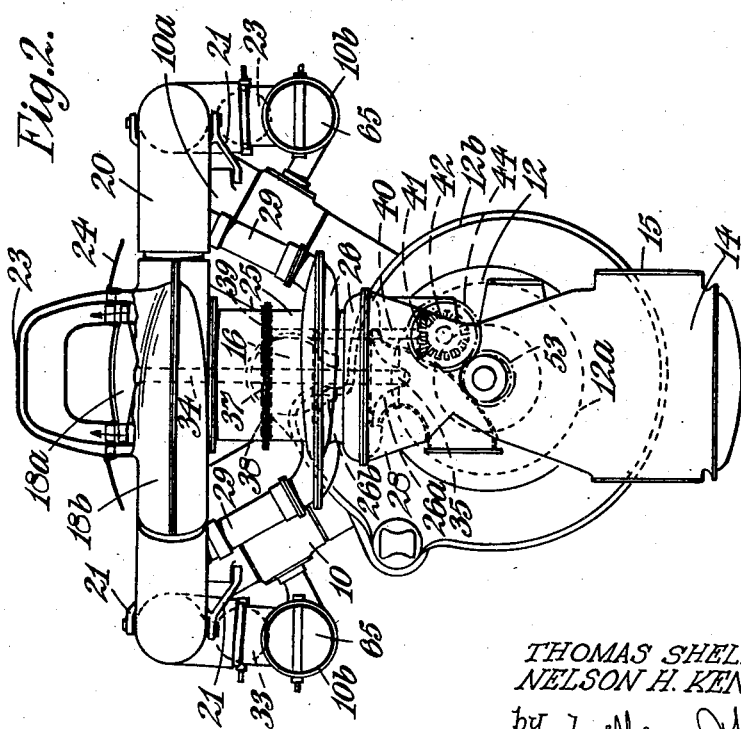
INVENTORS
THOMAS SHELLEY &
NELSON H. KENT
by Wilkinson Mawhinney
Attorneys

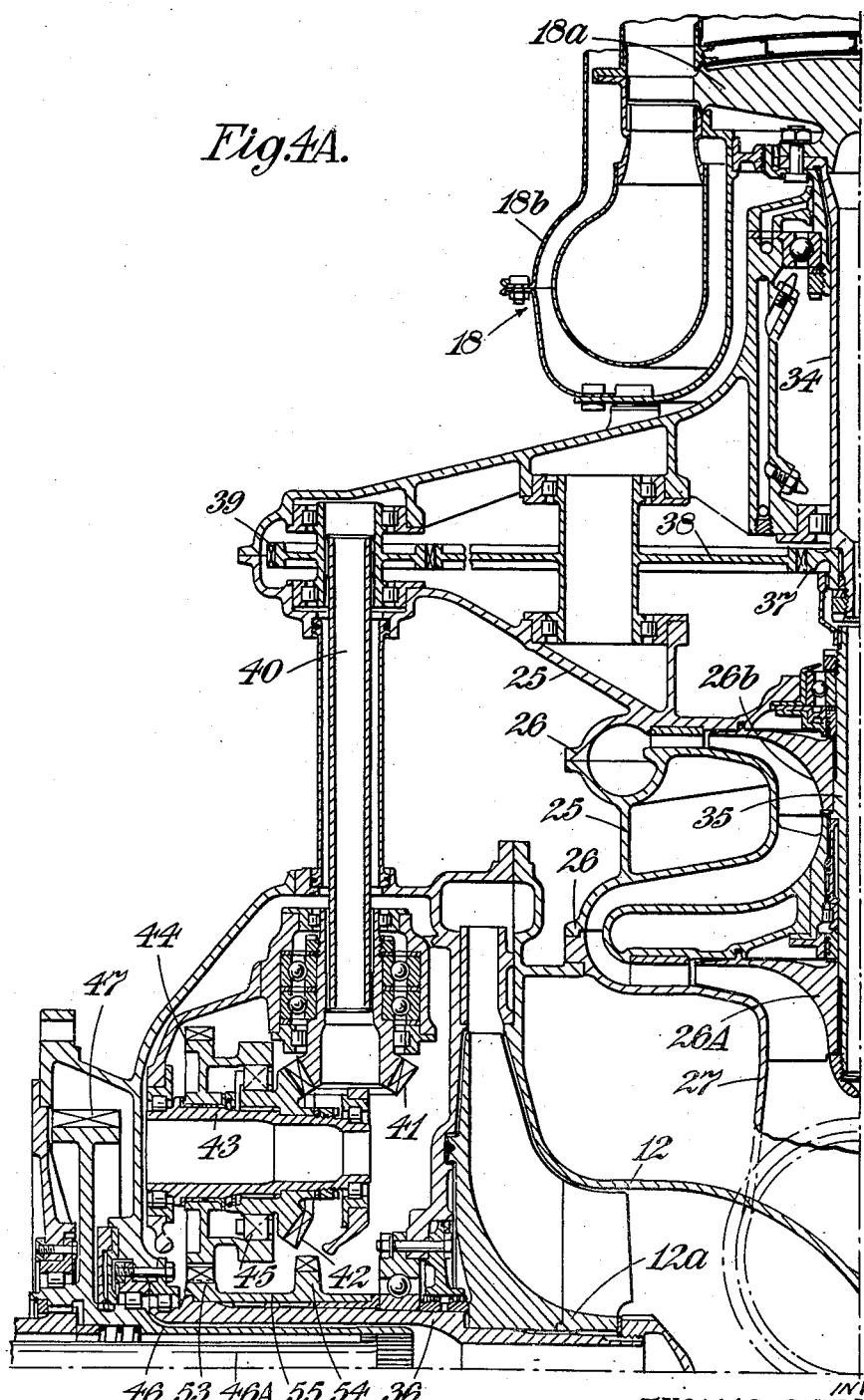

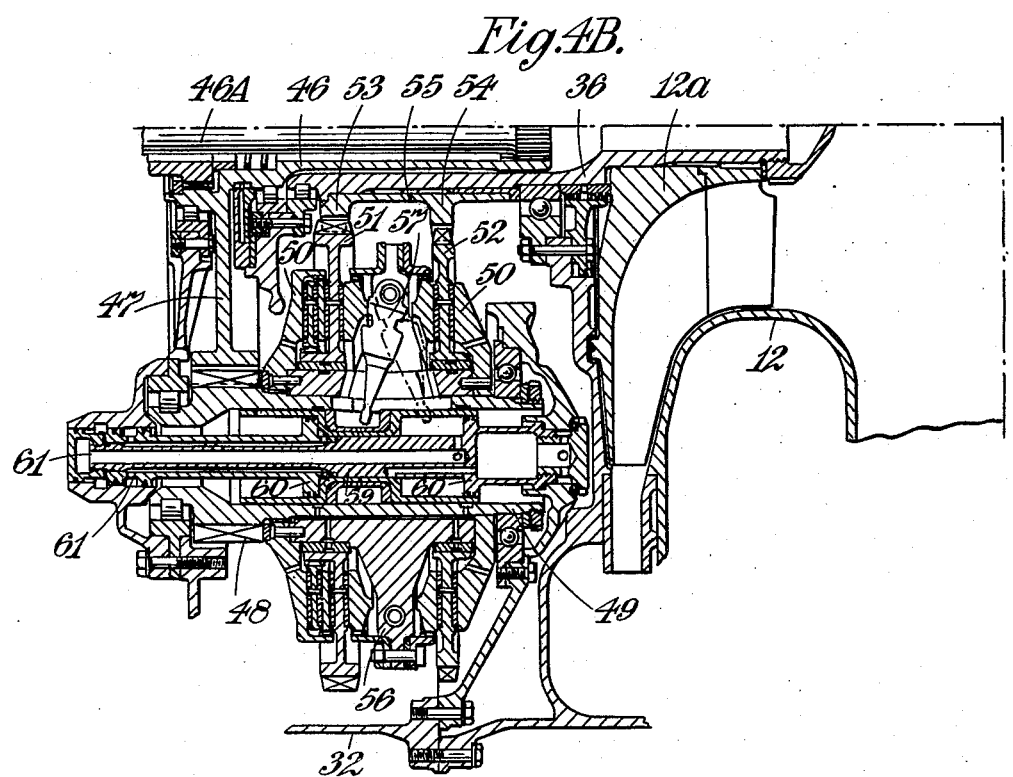

Patented Sept. 2, 1952

2,608,818

UNITED STATES PATENT OFFICE 2,608,818

INTERNAL-COMBUSTION ENGINE WITH SUPERCHARGER DRIVEN BY AN EXHAUST TURBINE

Thomas Shelley, Breaston, Derby, and Nelson Hector Kent, Allestree, Derby, England, assignors to Rolls-Royce Limited, Derby, England, a British company Application March 8, 1949, Serial No. 80,122
In Great Britain March 11, 1948

1 Claim. (Cl. 60—13)

This invention relates to aircraft power-plants of the kind comprising a reciprocating engine, a turbine driven by the exhaust gas therefrom, and a supercharger drivingly connected with the turbine.

Such power plants have hitherto been used in aircraft for the purpose of utilising heat available in the exhaust gas to provide power for driving the supercharger.

The invention seeks to provide a power plant of the kind referred to, which is compact in form, and which reduces the thermal losses in the exhaust turbine system.

According to the invention, the exhaust driven turbine is coupled to an additional compressor introducing air into the ducting supplying exhaust gas to the turbine for the purpose of reducing the temperature of the gas flowing through the turbine.

In constructions according to the invention, the supercharger may be disposed to rotate about an axis substantially parallel to or coaxial with the axis of the crankshaft of the reciprocating engine, with a suitable change-speed gear mechanism included in the drive therebetween, and the turbine may be mounted to rotate about an axis substantially at right angles to the axis of the supercharger, being drivingly connected through the change-speed mechanism with the engine crankshaft, such driving connection including a free-wheel between the turbine and change speed gear to permit the crankshaft to overrun the turbine.

It may be mentioned that it is not necessary that the turbine and supercharger rotate at equal speeds, suitable selection of gear ratios in the drive existing therebetween permitting of the appropriate choice of speeds.

The additional compressor may be directly coupled to the turbine or may be driven through gears introducing an appropriate speed ratio between the turbine and additional compressor.

One construction of power-plant embodying the invention will now be described with reference to the accompanying drawings in which—

Figure 1 is a side elevation of the power-plant;

Figure 2 is an end elevation from the right-hand end of Figure 1;

Figure 3 is a partial plan view; and

Figures 4A, 4B illustrate in section one construction of the mechanical driving connections between parts of the power plant.

The same references are used in all figures to indicate same parts.

Referring to the drawings and more especially to Figures 1 to 3, the power-plant comprises a V-in-line reciprocating internal combustion engine 10 suitable for aircraft propulsion, the engine driving an airscrew (not shown) through a shaft 11.

The plant also comprises a supercharging compressor 12 of the centrifugal type which is located at the rear end of the engine 10 with the axis of rotation of its impeller 12a (Figures 4A, 4B) coaxial with the axis (13) of rotation of the engine crankshaft (not shown). The supercharging compressor 12 has an air inlet 14 comprising a valve-box 15 for controlling the ingress of air to the compressor and delivers from its delivery scroll 12b through a pipe 16 to the inlet manifolds 17 of the engine which are located between the banks of cylinders. The supercharging compressor is drivingly connected with the crankshaft of the engine through a two-speed gear (Figure 4B) housed in a wheel case 32 (Figure 1).

The plant also comprises an exhaust turbine assembly 18, the turbine disc 18a of which is mounted with its axis 19 at right angles to axis 13 of the crankshaft and disposed slightly behind the compressor 12; and the disc 18a of which is also in a plane which is approximately on a level with the upper extremities of the cylinders as indicated by the valve gear covers 10a. The exhaust gas inlet to the turbine is in the form of a double scroll 18b (see Figure 3) and the two inlets to the scroll 18b are connected by ducts 20 respectively to the two exhaust manifolds 10b of the engine 10, there being one exhaust manifold per bank of cylinders. The ducts 20 are supported by brackets 21 from the valve gear covers 10a. This arrangement avoids excessive lengths of exhaust ducting.

The exhaust pipe 22 from the turbine is surrounded by a cowling 23 having a forwardly-facing air entry aperture 23a and the cowling 23 projects beyond the engine nacelle surface 24 and picks up air pressurized by the speed of flight. The cowling has a rearwardly-facing exhaust aperture 23b. This arrangement assists in cooling of the turbine.

The turbine assembly 18 is mounted on the upper end of a casing structure comprising the air inlet 14 and cover of the compressor, and a two-part casing 25.

The turbine disc 18a is directly coupled to an auxiliary two-stage centrifugal compressor, the delivery scrolls 26 for which are formed as swellings on the casing member 25. The inlet to the first stage impeller 26a (Figure 4A) of the auxiliary compressor is formed by a casing 27 housed in an inverted bell-shaped flange 28 formed on the cover of the compressor 12 and the upper part of the air inlet 14. As will be seen, the auxiliary compressor is located in the vertical sense between the turbine assembly and the air-intake to the supercharging compressor 12. A two-stage compressor is employed in this construction to avoid excessive diameter and thereby to obtain a compact installation.

The two-stage compressor delivers air into a pair of upwardly-directed ducts 29 located one on each side of the compressor and the air passes from the ducts 29 into jacket spaces 30 surrounding the exhaust passages in the ducts 20 and flows forwardly through the jacket spaces to adjacent the point where the ducts 20 connect with the exhaust manifolds 10b. The air then enters the exhaust passage through inlets 31 to mix effectively with the exhaust gases to cool them prior to their entry into the turbine inlet scrolls 18b. This arrangement also enables the ducts 20 to be short and reduces the thermal losses in the plant.

Suitable control means may be provided for controlling the supply of exhaust gas and/or cooling air to the turbine. For example, in this construction butterfly valves 33 are shown controlling the flow of exhaust gas from the exhaust manifolds 10b into the turbine inlet ducts 20. Additionally, bypass valves 65 in the exhaust manifolds control the flow of exhaust gas direct to atmosphere. Manual or automatic means may be provided such that under maximum power conditions of the engine the valves 33 are closed and the valves 65 are fully opened. When the turbine is operative during cruise conditions the valves 65 are closed and the valves 33 are open. In certain cases it may be desirable to provide an automatic pressure control for maintaining a substantially constant value of inlet pressure to the turbine 18 by operating the valves 65. Such a control may alternatively function to avoid the predetermined value of back pressure on the engine being exceeded. Additionally, when the turbine is operative the valves 33 may be controlled by a thermostatic device to avoid excessive inlet temperature to the turbine, whilst the supply of cooling air from the auxiliary compressor may be likewise controlled, the valve 33 being closed after the air supply control is adjusted to give the maximum flow of cooling air.

When the bypass valves 65 are opened the turbine is rendered inoperative, and in such a condition the provision of the free wheel referred to hereinafter is of particular importance, avoiding the absorption of power which would otherwise take place due to the turbine being driven by the engine. In the arrangement described it is intended that the turbine is operative during cruising power operation of the engine to reduce the specific fuel consumption thereof.

The turbine disc 18a is carried on a shaft 34 (Figure 4A) co-axial with a shaft 35 for the impellers 26a, 26b of the auxiliary compressor and is drivingly connected with the supercharger impeller shaft 36 through a gear train 37, 38, 39, including pinion drives on axes parallel to the axis 19 of the turbine disc and a vertical drive shaft 40 lying slightly forward of the supercharger compressor 12 and carrying at its lower end, a bevel gear 41 meshing with a complementary bevel gear 42 mounted on a layshaft 43 disposed parallel to the supercharger drive shaft 36. The layshaft 43 supports a free pinion 44, meshing with a pinion on the supercharger drive-shaft 36. The pinion 44 and the bevel gear 42 on the layshaft 43 are interconnected through a free-wheel drive 45, for example in the form of balls or rollers co-operating between relatively inclined surfaces. The free-wheel drive 45 is arranged so that power can be transmitted from the turbine 18a through the vertical drive shaft 40, bevel gears 41, 42, free-wheel 45, pinion 44 supported on the layshaft 43 and thence to the supercharger drive-shaft 36, whilst the drive is inoperative in the reverse direction, i. e. the supercharger drive-shaft 36 can overrun the turbine 18.

The engine crank shaft drives a stub shaft 46 (Figure 4B) through quill shaft 46A which stub shaft has secured to it a pinion 47 meshing with a pinion 48 formed on the layshaft 49 of a two-speed gear of generally known construction.

The shaft 49 is hollow and has secured to it the driving members 50 of a pair of friction clutches, the driven members of which are a pair of free rotatable pinions 51, 52 which mesh respectively with pinions 53, 54 set in a sleeve 55 surrounding and secured to the supercharging compressor drive shaft 36.

The shaft 49 also carries a spider member 56 in which are mounted a series of clutch-operating levers 57 (of which one is shown). The levers 57 are arranged to be rocked between two positions in which respectively the pinion 51 is clutched to the shaft 49 and the pinion 52 is clutched to the shaft 49, by a hollow piston member 58 slidable in the shaft 48.

The piston member 58 also slides on a fixed hollow spindle 59 having a pair of spaced radial walls 60 forming in effect the ends of a cylinder housing the piston member 58. Hydraulic fluid is fed through passages 61 in the spindle 59 to one side or other of the piston member 58 to move it along the spindle to rock the levers 57 which are maintained in a clutch-operating position by the centrifugal load on them.

The control of the hydraulic fluid supply may be in known or convenient manner and for example may be a manual control or an automatic control. In the latter case, for instance, the automatic control may be by means of an altitude-sensitive capsule device. The arrangement, as is known, is such that increased rotational speed of the supercharger is obtainable for increasing the supercharger compression ratio at high altitude.

In the arrangement described above, it will be appreciated that the turbine 18 and supercharger 12 rotate at speeds which are in fixed proportion, and the change-speed gear, effective between the supercharger drive shaft 36 and the crankshaft, determines the ratio of the supercharger and turbine speeds to the crankshaft speed. When the exhaust-driven turbine is in use a major part or the whole of the power absorbed by the supercharger is derived from the turbine, which delivers its power through a gear train to the supercharger drive shaft, any surplus power going into the crankshaft.

Considering now an aircraft fitted with a power plant as above described, and climbing with its engine running at constant speed with the exhaust turbine operative, the use of a known type of boost control on the engine charge inlet pressure will operate to maintain a preselected value of boost, and at a certain altitude in order to maintain this value the change speed gear will be operated to increase the rotational speed of the supercharger, thus to increase its compression ratio. This change of supercharger speed is accompanied by a corresponding increase in the operating speed of the turbine rotor since the turbine 18 is geared to the supercharger shaft 36. This is advantageous since the decrease in ambient atmospheric pressure will have increased the expansion ratio across the turbine and operation at increased speed results in obtaining greater expansion efficiency. As previously mentioned, the turbine inlet pressure may be controlled to maintain a predetermined absolute value by actuation of the bypass valves 65, the expansion ratio across the turbine then being determined by the ratio of such pressure to ambient atmospheric pressure.

Further it will be appreciated that overheating of the turbine can be avoided and the thermal losses from the engine reduced.

A further advantage of the plant is its compact arrangement facilitating its installation in an aircraft.

It will be appreciated that the invention is not limited to the embodiment described above. For example, in certain cases the additional compressor may be omitted, appropriate cooling of the exhaust gas being obtained by radiation from the ducts, or by introduction of cooling air from a tapping from the main supercharger. The latter system would be possible where fuel carburation is not effected in the supercharger.

Again alternative locations of the turbines are possible, although it will be appreciated from the above description that the disposition of the plane of the turbine rotor disc approximately on the same plane as the cylinder heads of the engine, results in a compact installation avoiding complication of ducting of the exhaust gas to and from the turbine.

We claim:

A power plant comprising in combination a reciprocating internal combustion engine; a turbine; an exhaust duct between said engine and said turbine to lead the exhaust gas from said engine to said turbine; a bypass exhaust gas duct leading from said engine to atmosphere; controllable valve means to control the amount of exhaust gas flowing from said engine through said bypass duct directly to atmosphere; a supercharging compressor; a first drive connection between said turbine and said supercharging compressor; a second drive connection between said engine and said supercharging compressor; a change speed gear in said second drive connection; an auxiliary compressor having an inlet to atmosphere; a discharge from said auxiliary compressor leading to said exhaust duct; a third drive connection between said turbine and said auxiliary compressor; and a freewheel device in said first drive connection arranged to permit said supercharging compressor to overrun said turbine and said auxiliary compressor.

THOMAS SHELLEY.
NELSON HECTOR KENT.

REFERENCES CITED

The following references are of record in the file of this patent:

UNITED STATES PATENTS

| Number | Name | Date |
| --- | --- | --- |
| 2,197,179 | Hersey | Apr. 16, 1940 |
| 2,277,839 | Becht | Mar. 31, 1942 |
| 2,278,181 | Lieberherr | Mar. 31, 1942 |
| 2,385,366 | Lysholm | Sept. 25, 1945 |
| 2,386,096 | Ehrling | Oct. 2, 1945 |
| 2,400,068 | Birkigt | May 14, 1946 |
| 2,402,725 | Birkigt | June 25, 1946 |
| 2,421,518 | Molloy | June 3, 1947 |
| 2,444,456 | Lysholm | July 6, 1948 |

FOREIGN PATENTS

| Number | Country | Date |
| --- | --- | --- |
| 206,845 | Great Britain | Feb. 21, 1924 |
| 369,033 | Great Britain | Mar. 17, 1932 |
| 421,110 | Great Britain | Dec. 17, 1934 |
| 507,974 | Great Britain | June 23, 1939 |